United States Patent [19]
Goo

[11] Patent Number: 5,634,146
[45] Date of Patent: May 27, 1997

[54] CAMERA WITH AUTOMATIC FLASH FUNCTION AND METHOD FOR CONTROLLING THE SAME

[75] Inventor: Bon-jeong Goo, Changwon-si, Rep. of Korea

[73] Assignee: Samsung Aerospace Industries, Ltd., Kyeongsangnam-do, Rep. of Korea

[21] Appl. No.: 224,306

[22] Filed: Apr. 7, 1994

[30] Foreign Application Priority Data

Apr. 14, 1993 [KR] Rep. of Korea ............... 1993-6234

[51] Int. Cl.⁶ ................................ G03B 15/02
[52] U.S. Cl. ....................... 396/61; 396/167; 396/159
[58] Field of Search ................... 354/418, 127.1, 354/127.11, 127.12, 127.13, 419, 413, 416, 145.1

[56] References Cited

U.S. PATENT DOCUMENTS

| | | |
|---|---|---|
| 3,836,920 | 9/1974 | Uchiyama et al. ............ 354/27 |
| 4,188,104 | 2/1980 | Uchiyama et al. ............ 354/31 |
| 4,201,934 | 5/1980 | Esaki ............ 315/151 |
| 4,375,322 | 3/1983 | Coppa et al. ............ 354/27 |
| 4,486,086 | 12/1984 | Kresock ............ 354/413 |
| 5,016,038 | 5/1991 | Kobayashi et al. ............ 354/418 |
| 5,148,212 | 9/1992 | Serikawa et al. ............ 354/416 |
| 5,198,855 | 3/1993 | Iwai ............ 354/414 |
| 5,367,355 | 11/1994 | Foust ............ 354/418 |

Primary Examiner—Safet Metjahic
Assistant Examiner—Eric Nelson
Attorney, Agent, or Firm—Finnegan, Henderson, Farabow, Garrett & Dunner, L.L.P.

[57] ABSTRACT

A camera having an automatic flash function according to a charge amount and a method includes a microcontroller for flashing a strobe and carrying out a photograph when a photograph with a suitable exposure can be obtained with a presently charged voltage. A transient, spontaneous image can be obtained after the microcontroller determines a relationship between a measured distance from an object to be photographed and the charged voltage of the strobe when a release switch for the photograph is operated even while the strobe is being charged. The camera includes a power switch, a first step release switch, a second step release switch, an automatic distance measuring circuit, a brightness measuring circuit, the strobe, the shutter and a motor driving circuit which are all connected to the microcontroller.

10 Claims, 4 Drawing Sheets

CAMERA WITH AUTOMATIC FLASH FUNCTION AND METHOD FOR CONTROLLING THE SAME

BACKGROUND OF THE INVENTION

1. Field of the Invention

The present invention relates generally to a camera having an automatic flash function and method. More particularly, the present invention relates to a camera having an automatic flash function in accordance with an amount of charge voltage.

2. Description of the Related Art

Generally, the quality of a photograph depends mainly on an ambient brightness around an object when taking a photograph. Therefore, a problem associated with ambient brightness around the object, especially at night or indoors, at the time of photographing has been solved by voluntarily emitting a flash for a predetermined time to have almost the same effect as sunlight. Accordingly, the flash, which has a large amount of light and a high color temperature, compensates for the inadequate brightness when taking a photograph at night or indoors.

For carrying out the above operation, the camera should include a strobe and such strobe should emit a transient flash concurrently with the operation of a shutter. To emit the transient flash, a Xenon lamp capable of emitting the flash is used. Conventionally, since the camera is portable, a light dry battery is used for power, but the Xenon lamp requires a much higher voltage for power. A transformer is used which increases the voltage level of the dry battery to output the higher voltage power. Accordingly, the dry battery, the transformer and the Xenon lamp are basic elements in a strobe circuit, and are properly used with variations in accordance with required designs. Such a strobe device is designed to operate concurrently with the operation of the shutter to emit a predetermined amount of flash.

"Strobe Control Apparatus", U.S. Pat. No. 5,016,138 issued on May 14, 1991 discloses a conventional technique as follows. The technique does not charge the strobe if a set time to prevent the charging does not pass by after the charging is completed to prevent incorrect operations of devices such as a transistor and the transformer of the strobe due to heat generated by frequent emissions of the strobe if the charging time and the charged voltage of the strobe are selected in accordance with the operation condition of the camera, or stops the charging if the charging time passes by, even though the strobe is not fully charged.

However, the above "Strobe Control Apparatus" has a disadvantage because the user cannot capture a transient, spontaneous image of an object when the user wishes to take a photograph quickly, taking into consideration the distance from the object and an F number, since strobe charging is controlled in accordance with the charging time and the charged voltage of the strobe.

The conventional camera has other disadvantages in that the user will miss the opportunity to photograph the transient, spontaneous image since the photograph is possible only when the strobe is fully charged even though the release switch is activated. Accordingly, the user cannot obtain a photograph with suitable exposure since the strobe emits a predetermined amount of flash, regardless of the distance from the object.

SUMMARY OF THE INVENTION

An object of the present invention is to provide a camera having an automatic flash function according to a charge amount and method that overcomes the problems and disadvantages of the conventional devices.

To achieve this and other objects and in accordance with the purpose of the invention, as embodied and broadly described herein, a camera having an automatic flash function includes first means for measuring a distance with respect to an object to be photographed; second means for measuring an ambient brightness surrounding the object; a shutter for operating the camera; a strobe for emitting a flash when energized; means for charging the strobe when power is applied to the camera; and a microcontroller which includes first means, responsive to said first and second measuring means, for determining whether a measured distance from the object is within the range for the strobe to be energized sufficient to obtain a photograph with a suitable exposure, second means, responsive to the first determining means, for determining a charge state of the strobe when it is determined that the distance from the object is within the range for the strobe to be energized, third means, responsive to the second determining means, for determining a first duration of the flash from the strobe based on the measured distance and brightness when the strobe is completely charged, means, responsive to the second determining means, for comparing a present charge state of the strobe to a predetermined minimum charge voltage when the strobe is not completely charged, fourth means, responsive to said comparing means, for determining whether a photograph of the object is possible at the measured distance from the object and at the present charge state, means, responsive to said fourth determining means, for calculating a second duration of the flash from the strobe when it is determined that the photograph of the object is possible, and means for energizing the strobe for a selected one of the first and second durations of the flash.

According to another aspect of the invention, a camera of the present invention having an automatic flash function according to a charge amount includes a switch block including a power switch for producing a selection input by a user to an electric signal, a first step release switch, a second step release switch, and a photographing mode conversion switch; an automatic distance measuring circuit for measuring a distance from an object and for producing a corresponding signal to the measured distance when a first step release switch in the switch block is activated; a brightness measuring circuit for measuring an ambient brightness around the object and for producing a corresponding signal to the measured brightness when the first step release switch in the switch block is activated; a shutter for carrying out the photography when a second step release switch is activated; a strobe for emitting a predetermined amount of flash to supplement an illumination on the object when the amount of light is insufficient; a microcontroller for charging the strobe when power is applied to the camera, for receiving the measured distance and brightness signals when the first step release switch in the switch block is activated, for determining whether the distance from the object is within a range for the strobe to be emitted in accordance with the measured signals to obtain a photograph with a suitable exposure, for determining the charge state of the strobe when the distance from the object is within the range for the strobe to be emitted, for determining a flash time of the strobe in accordance with the measured distance and the calculated amount of exposure when the charging of the strobe is complete, for determining whether the present charge state of the strobe is higher than a minimum charged voltage when the charging of the strobe is not completed, for determining whether the photograph corresponding to the distance from the object is possible in the present charge state when the present charged voltage is higher than the minimum charged voltage, for calculating the flash time of the strobe when the photograph is possible, for driving the shutter when the second step release switch is activated, for emitting the strobe during the flash time, and for carrying out the photography.

According to another aspect of the present invention, a microcontroller is provided for determining whether an aperture can be adjusted to obtain a photograph of a suitable exposure in accordance with a distance from an object and a charge state of a strobe when a release switch is activated even when the charging is not complete, for carrying out the photography by flashing the strobe, for capturing a transient, spontaneous image, for saving a charge energy of the strobe by reducing the F number and shortening the flash time of the strobe when the distance from the object is less than a predetermined distance, and for saving the dry battery power by shortening the interval of the strobe photograph time.

According to another aspect of the invention, a method for controlling a camera having an automatic flash function with a strobe and a shutter includes the steps of charging the strobe when power is applied to the camera; measuring the distance from the camera to an object to be photographed; measuring an ambient brightness surrounding the object; determining whether the strobe should be used in accordance with the measured distance and brightness to obtain a photograph with a suitable exposure; checking a charge state of the strobe when it is determined that the strobe should be used; comparing a present charge state of the strobe and a predetermined minimum charge voltage when the strobe is not completely charged; setting a duration for a flash of the strobe when the photograph is possible in the present charge state; and energizing the strobe for the set duration when the camera is activated.

According to another aspect of the present invention, a method for controlling a camera having an automatic flash function according to a charge amount includes the steps of starting to charge the strobe when power is applied to the camera; measuring a distance from an object to be photographed, measuring an ambient brightness around the object, and calculating an exposure amount in accordance with the measured distance and brightness when the first step release switch is activated after detecting whether the first step release switch is activated; determining whether the distance from the object is within a range for the strobe to be used in accordance with the measured distance brightness to obtain a photograph with a suitable exposure, and checking the charge state of the strobe when the strobe is used for the range; comparing the present charged voltage to a minimum charged voltage when the charging of the strobe is not completed, calculating the brightness of the strobe in accordance with the relationship of the measured distance and an F number when the present charged voltage is higher than the minimum charged voltage, and setting the flash time of the strobe when the photograph is possible in the present charge state; and carrying out the photography by flashing the strobe during the set flash time of the strobe when the second step release switch is activated.

The objects and advantages of the invention will be set forth in part in the description which follows, and in part will be obvious from the description, or may be learned by practice of the invention. The objects and advantages of the invention will be realized and attained by means of the elements and combination particularly pointed out in the appended claims.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to the preferred embodiment of the invention, an example of which is illustrated in the accompanying drawings. Wherever possible, the same reference numbers will be used throughout the drawings to refer to the same or like parts.

Figure 1:
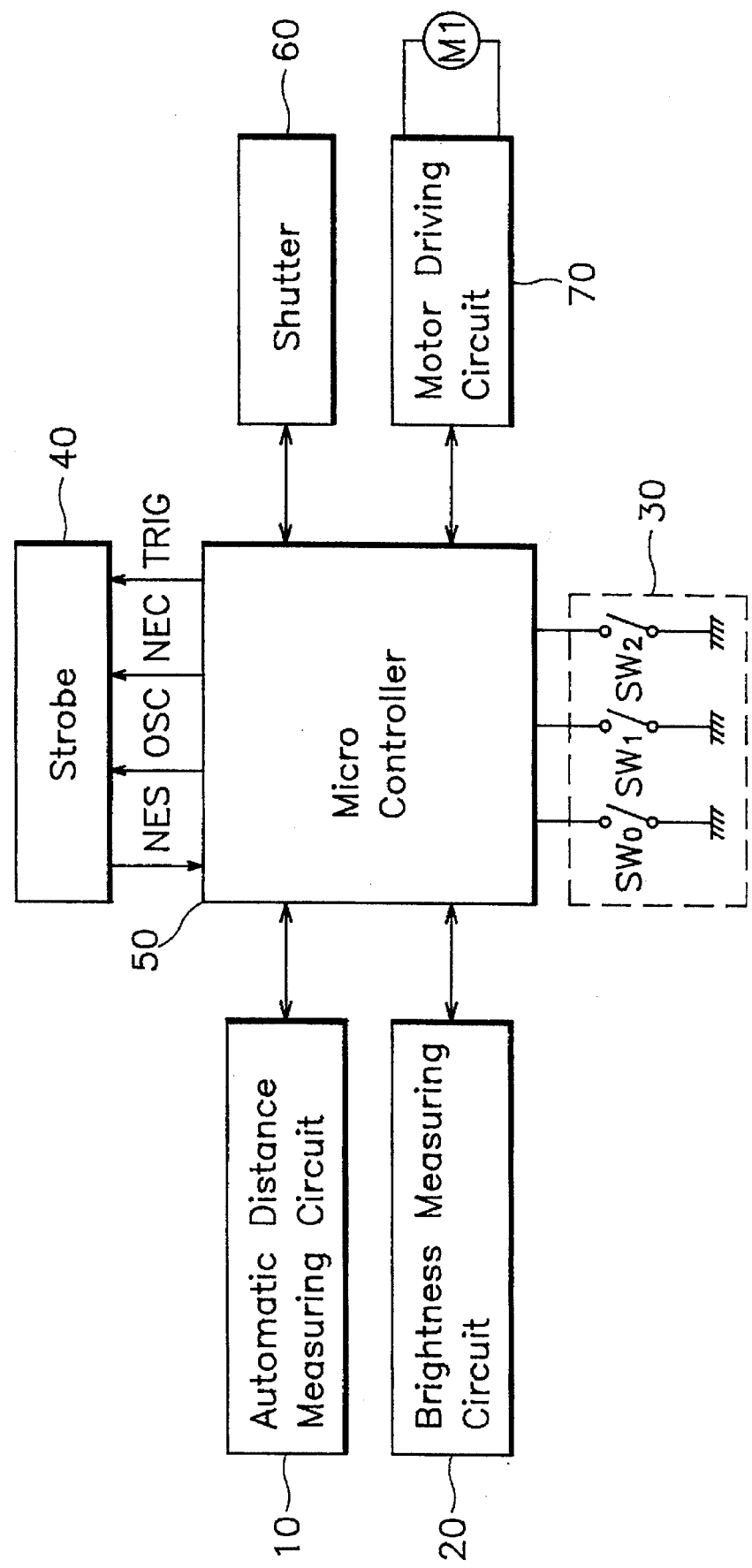
FIG. 1 is a block diagram of a camera having an automatic flash function according to a charge amount in accordance with an embodiment of the present invention.

FIG. 1 is a block diagram of a camera having an automatic flash function according to a charge amount in accordance with an embodiment of the present invention. As shown in FIG. 1, the preferred embodiment of the present invention includes an automatic distance measuring circuit 10 for measuring a distance from an object to be photographed, a brightness measuring circuit 20 for measuring an ambient brightness around the object, a switch block 30 for inputting user selections, a strobe 40 for emitting a flash of a predetermined illumination, a microcontroller 50 connected to output terminals of the above components, a shutter 60 connected to the output terminal of the microcontroller 50 and for controlling an exposure time, a motor driving circuit 70 connected to the output terminal of the microcontroller 50 and for driving a motor, and a lens barrel motor M1 connected to the output terminal of the motor driving circuit 70.

Figure 2:
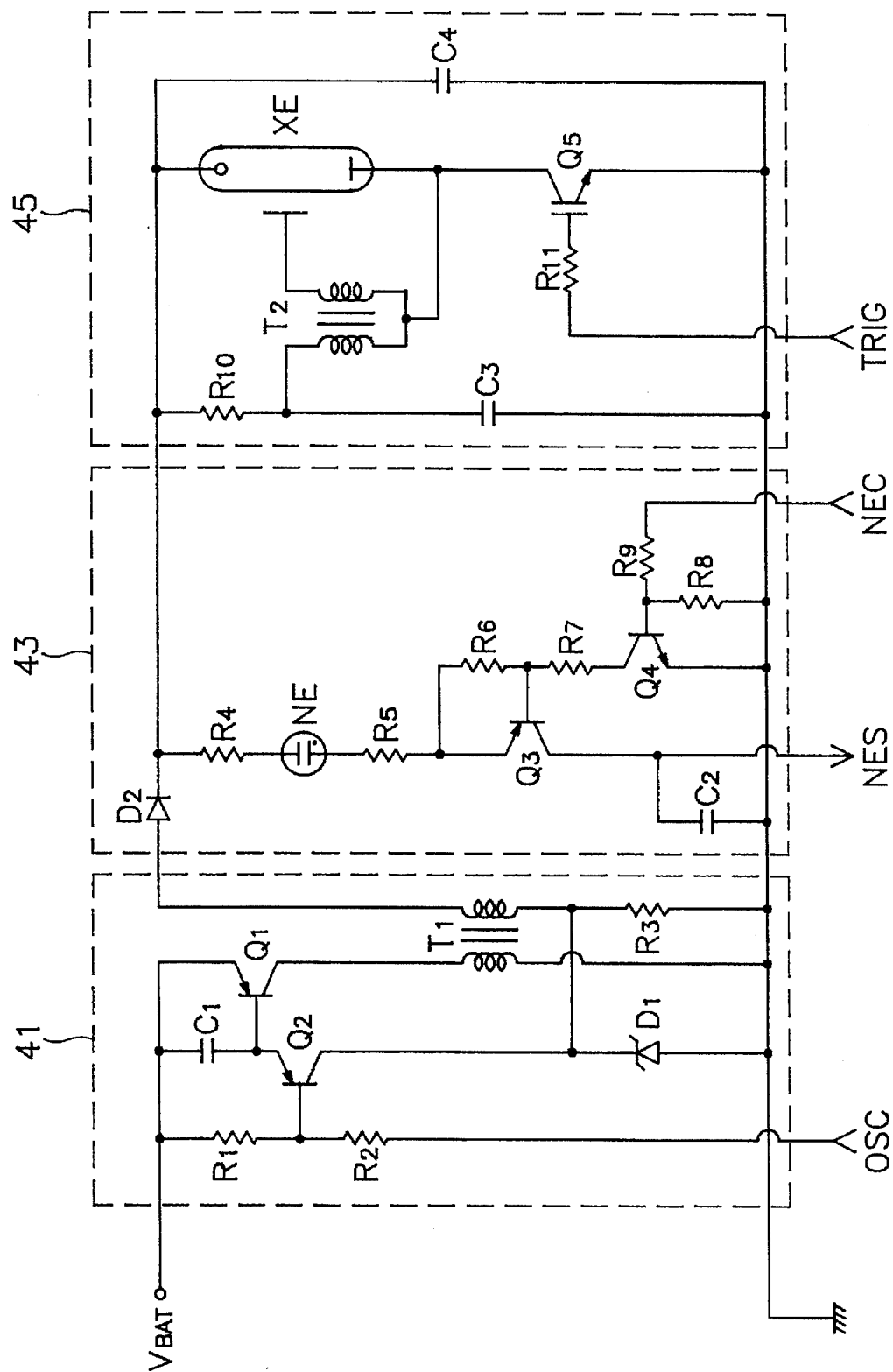
FIG. 2 is a detailed circuit diagram of a strobe in the camera of the embodiment of FIG. 1.

FIG. 2 shows a detailed circuit of the strobe 40. The strobe 40 includes a direct current DC converter 41 for increasing the DC voltage to a predetermined voltage for the strobe flash, a sensor 43 for sensing whether the voltage produced from the DC converter 41 is charged to a sufficient voltage for the strobe flash, and an emitter 45 for emitting a flash of a predetermined illumination after being charged with the voltage produced from the DC converter 41.

The DC converter 41 includes a resistor R1 with one terminal connected to a power terminal, a capacitor C1, and a resistor R2 with one terminal connected to the resistor R1. The other terminal of the resistor R2 is connected to a terminal of a charge signal OSC. The DC convertor 41 includes a transistor Q1 with an emitter connected to the power terminal and a base connected to the capacitor C1, and a transistor Q2 with an emitter connected to the capacitor C1. The capacitor C1 is connected to the resistor R1. The DC converter 41 includes a diode D1 with an anode terminal connected to a collector of the transistor Q2 and a cathode terminal connected to a ground electrode, a transformer T1 with one terminal of the first coil connected to the collector terminal of the transistor Q1 and the other terminal connected to the ground electrode, and a resistor R3 with one terminal connected to one terminal of the second coil of the transformer T1. The other terminal of the register R3 is connected to the ground electrode.

The sensor 43 includes a diode D2 with a cathode terminal connected to another terminal of the second coil of the transformer T1, a resistor R4 with one terminal connected to the anode terminal of the diode D2, a Neon lamp NE with one terminal connected to the resistor R4, and a resistor R5 with one terminal connected to the neon lamp NE. The sensor 43 includes a transistor Q3 with an emitter connected to the resistor R5 and a collector connected to a charge state signal NES, and a capacitor C2 with one terminal connected to the collector of the transistor Q3. The other terminal of the capacitor C2 is connected to the ground electrode. The sensor 43 includes a resistor R6 with one terminal connected to the resistor R5 and the other terminal connected to a base of the transistor Q3, and a resistor R7 with one terminal connected to the resistor R6. The sensor 43 includes a transistor Q4 with a collector connected to the resistor R7 and an emitter connected to the ground electrode, a resistor R8 with one terminal connected to a base of the transistor Q4 and the other terminal connected to the ground electrode, and a resistor R9 with one terminal connected to the base of the transistor Q4 and the other terminal connected to a terminal for a charge end check request signal NEC.

The emitter 45 includes a resistor R10 with one terminal connected to an anode terminal of the diode D2, a capacitor C3 with one terminal connected to the resistor R10 and the other terminal connected to the ground electrode, and a Xenon lamp XE with one terminal connected to the anode terminal of the diode D2. The emitter 45 includes a transformer T2 with one terminal of the first coil connected to the resistor R10, one terminal of second coil connected to the Xenon lamp XE. The other terminals of both the first and second coils are connected to another terminal of the Xenon lamp XE. A resistor R11 has one terminal connected to a flash signal TRIG terminal, and a transistor Q5 has a collector connected to the Xenon lamp XE, an emitter connected to the ground electrode, and a base connected to the resistor R11.

Figure 3:
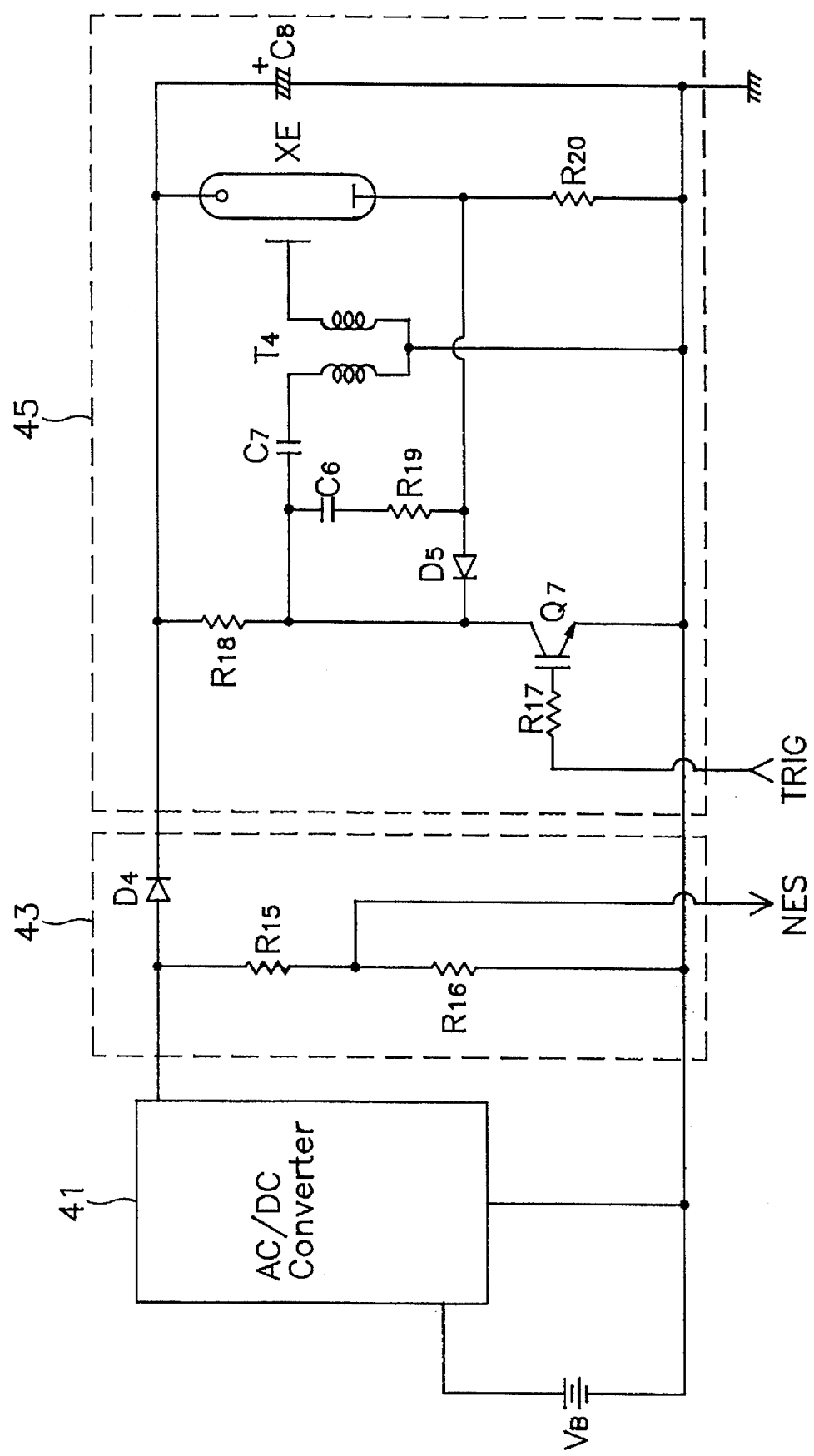
FIG. 3 is a detailed circuit diagram of a strobe in the camera in accordance with another embodiment of the present invention.

FIG. 3 is a detailed circuit diagram of a strobe in the camera in accordance with another embodiment of the present invention.

Referring to FIG. 3, the sensor 43 includes a diode D4 with an anode terminal connected the output terminal of the DC converter 41, and a pair of resistors R15 and R16 connected serially between the output terminal of the DC converter 41 and ground electrode. A contact point of the pair of resistors R15 and R16 is connected to the charge state signal terminal NES.

The emitter 45 includes a resistor R18 with one terminal connected to a cathode terminal of the diode D4, a resistor R17 with one terminal connected to a terminal for a flash signal TRIG, a transistor Q7 with a gate terminal connected to the other terminal of the resistor R17, a collector terminal connected to the other terminal of the resistor R18 and an emitter terminal connected to the ground electrode, capacitors C6 and C7 with each one terminal connected to the collector terminal of the transistor Q7, a resistor R19 with one terminal connected to the other terminal of the capacitor C6, a diode D5 with a cathode terminal connected to the collector terminal of the transistor Q7 and an anode terminal connected to the other terminal of the resistor R19, a transformer T4 with a first coil connected between the other terminal of the capacitor C7 and the earth, an Xenon lamp XE with a control terminal connected to a second coil of the transformer T4, a resistor R20 connected between the Xenon lamp XE and the ground electrode, and a capacitor C8 connected between an output terminal of the sensor 43 and the ground electrode.

Figure 4:
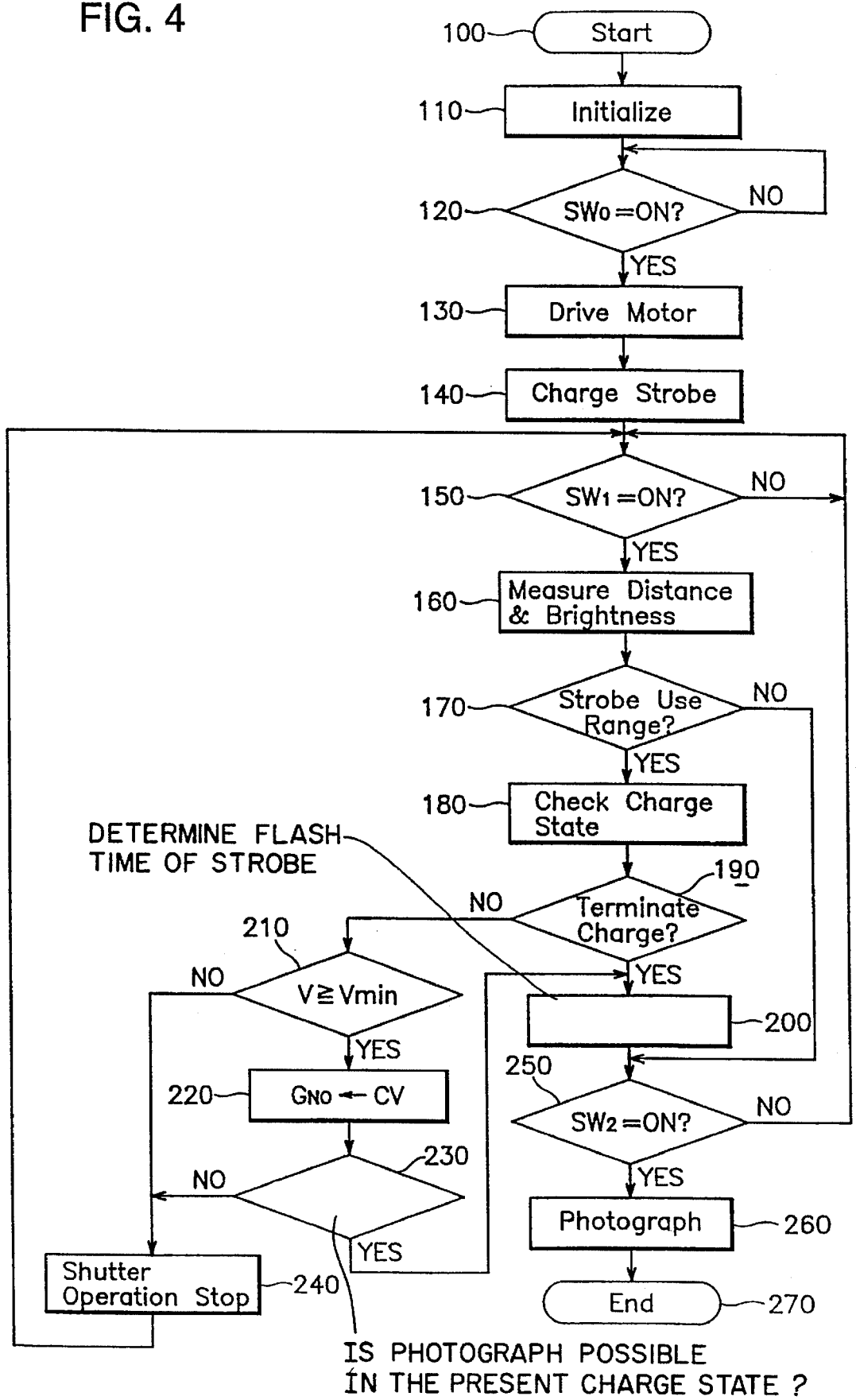
FIG. 4 is a flowchart of the steps in a method for controlling the camera with an automatic flash function in the embodiment of the present invention.

The operation of the camera in accordance with the embodiment of the present invention will be explained in accordance with the flowchart of FIG. 4.

When power is applied to the camera, the microcontroller 50 initializes all variables (Step 110) and determines whether a power switch SW0 is turned ON (Step 120). When the power switch is not turned ON, the camera is placed in a standby mode. If the power switch SW0 is turned ON, however, the microcontroller 50 operates the motor driving circuit 70 to drive the lens barrel motor M1, and the lens cap is opened (Step 130).

Although the above embodiment in accordance with the present invention is applied to a camera of which the lens cap is automatically opened when the power switch SW0 is activated, the present invention is not limited to the above camera.

When the lens cap is opened and the camera is ready to take a photograph in step 130, the microcontroller 50 emits a flash of a predetermined illumination if the illumination is insufficient, and outputs a charge signal OSC to the strobe 40. The charge signal OSC oscillates from a high level to a low level for charging the strobe to obtain a photograph with a suitable exposure (Step 140).

When the charge signal OSC is at a high level in step 140, the high signal is applied to the base terminal of the transistor Q2 of the DC converter 41 of the strobe 40 and accordingly, the transistor Q2 is turned OFF. When the transistor Q2 is turned OFF, a high signal is applied to the base terminal of the transistor Q1 and accordingly, the transistor turned OFF. Hence, the strobe 40 remains in the standby mode.

When the strobe 40 remains in the standby mode and if the microcontroller 50 produces the charge signal OSC of low level, the low signal is applied to the base terminal of the transistor Q2 and current flows through. When the current flows through the transistor Q2, a low signal is applied to the base terminal of the transistor Q1, and a current flows through the transistor Q1.

The current flows through the transistor Q1, as discussed above, and continues to flow through the first coils of the transformer T1. Accordingly, dielectric power is generated on the second coils. At this point, the current which flows through the transistor Q2 flows through the diode D1, and the capacitor C4 of the emitter 45 starts charging. Also, a voltage is generated between the second coils of the transformer and the resistor R3, the collector voltage of the transistor Q2 is higher than the collector voltage of the transistor Q1 to turn ON the transistor Q1, and a high signal is applied to the base terminal of the transistor Q1, so that the transistor is turned OFF. Since the transistor Q1 is turned OFF, the current does not flow through the first coils of the transformer T1, and the inductive voltage of the second coils of the transformer T1 is lost.

When the above operations are repeated with the charge signal OSC oscillating high to low, the transistor Q1 is repeatedly turned ON and OFF, the current flows through the transistor Q2, and the capacitor C4 is charged with time.

The microcontroller 50 determines whether the first step release switch SW1 is turned ON after beginning to charge the strobe 40 by transmitting the charge signal to the strobe 40 (Step 150). If the first step release switch SW1 is turned ON, the microcontroller 50 drives the automatic distance measuring circuit 10 and measures the distance from the object. Also, the microcontroller 50 measures the ambient brightness around the object through the brightness measuring circuit 20, calculates the exposure amount at that time, and stores the calculated exposure amount in a memory (not shown) of the microcontroller 50.

The microcontroller 50 determines whether the strobe should be flashed at the distance from the object in accordance with the F number at the measured distance and the exposure amount calculated above (Step 170).

The relationship among the distance L from the object, the brightness of the strobe GNo and the F number FNo is as follows:

$$GNo = FNo \times L \qquad (1)$$

The relationship among the brightness GNo of the strobe, capacitance C of the capacitor C4 of the strobe 40 and the charge voltage V of the capacitor C4 is as follows:

$$E = 0.5 \times C \times V^2 \qquad (2)$$

$$GNo^2 = \alpha \times C \times V^2 \qquad (3)$$

where E is the potential energy of the capacitor, $\alpha$ is a proportionality constant. The following equation can be expressed by combining (1) and (3).

$$(FNo \times L)^2 = \alpha \times C \times V^2 \qquad (4)$$

If the capacitance C of the capacitor C4 is a constant, namely, $\alpha C = \beta^2$, the following equations can be obtained.

$$FNo = (\beta \times V) \div L \qquad (5)$$

$$L = (\beta \times V) \div FNo \qquad (6)$$

$$V = (FNo \times L) \div \beta \qquad (7)$$

The F number FNo is activated within the ranges of a maximum F number, FNo max, and a minimum F number, FNo min, in accordance with an aperture of the lens, the focal length and the operation range of a diaphragm. If the measured distance is L', the charge voltage of the strobe is V', and the strobe does not flash automatically until the F number can satisfy the following equation:

$$FNo\ min \leq FNo = (\beta \times V') \div L' \leq FNo\ max \qquad (8)$$

If the calculated F number FNo does not satisfy equation (8), the strobe is charged to a charge voltage V" which satisfies the equation, V"=(FNo min×L)÷β, and the charge is completed. Hence, the strobe flashes when the F number is the minimum F number, FNo min.

The microcontroller 50 receives the F number FNo in accordance with the exposure amount which is calculated in accordance with the measured distance L by the automatic distance measuring circuit 10 and the brightness signal by the brightness measuring circuit 20. The microcontroller determines whether the distance from the object is in the range where the strobe should be flashed in accordance with the above equation (1) to obtain a photograph with a suitable exposure (Step 170).

When focal length is changed, the microcontroller 50 determines a zoom position through an input of an encoder switch in the switch block 30, calculates the F number FNo in accordance with the zoom position, and determines whether a photograph with a suitable exposure can be obtained in the present charge state of the strobe in accordance with the adjusted F number FNo. If a photograph with a suitable exposure can be obtained only when the strobe is flashed, the microcontroller 50 outputs the charge end check request signal NEC of high level to the strobe 40. If a photograph with a suitable exposure can be obtained without the flash from the strobe, the second step release switch is placed in the standby mode to be turned ON.

If the charge is made in accordance with the ON/OFF operations of the transistors Q1 and Q2 and a voltage higher than a lighting voltage is applied to the Neon lamp NE, the Neon lamp NE is lighted and current flows out of the Neon lamp NE.

When the charge end check request signal NEC of high level generated from the microcontroller 50 is applied to the base terminal of the transistor Q4 of the strobe 40, a current flows through the transistor Q4 and a low signal is applied to the base terminal of the transistor Q3, and the current which flows from the Neon lamp NE, namely, the charge state signal NES, is input to the microcontroller 50 through the transistor Q3. At this time, since the current which flows through the transistor Q3 changed in accordance with the voltage of the capacitor C4, the charge voltage of the strobe 40 can be checked through the charge state signal NES (Step 180).

The microcontroller 50 calculates the minimum F number, FNo min, in accordance with the charge voltage V of the strobe and the distance n from the object in accordance with the charging state signal NES produced from the strobe 40, and determines whether the charging of the strobe is completed (Step 190). If the strobe 40 is fully and completely charged for flashing, the flash time of the strobe 40 can be determined (step 200).

The microcontroller 50 determines whether the second step release switch SW2 is turned ON (Step 250) after the flash time t of the strobe 40 is determined by the step 200. At this time, the energy of the strobe 40 can be saved since the flash time of the strobe 40 will be short if the distance from the object is short.

If the charge voltage of the charge state signal NES produced from the strobe 40 in step 190 is not complete, the microcontroller 50 determines a relationship between the present charge voltage V and a minimum charge voltage Vmin (Step 210). If the charge voltage V is greater than or equal to the minimum charge voltage Vmin, the microcontroller 50 sets the brightness GNo of the strobe 40 to the value of capacitance C multiplied by the charge voltage V (Step 220), and determines whether a photograph is possible in the present charge state by the following equation (Step 230):

$$GNo \geq (FNo \times L) \qquad (10)$$

If the brightness of the strobe is greater than or equal to the reference brightness of equation (10), i.e., if a photograph is possible in the present charge state of the strobe 40, the microcontroller calculates the flash time of the strobe 40 (Step 200), and then determines whether the second step release switch SW2 is turned ON.

If the microcontroller 50 determines that the charge voltage V of the strobe 40 is less than the minimum charge voltage Vmin, or the brightness GNo of the strobe is less than the value resulting from the equation (10), i.e., a photograph with a suitable exposure can not be obtained if the user takes the photograph in the present charge voltage, the microcontroller 50 stops the operation of the shutter 60 to prevent an underexposed photograph, and the process is placed in a standby mode to completely charge the strobe 40.

The microcontroller 50 determines whether the second step release switch is turned ON after determining that the photograph is possible in the present charge voltage V and the flash time of the strobe 40 (Step 250). The microcontroller 50 controls the focusing in accordance with the measured distance by the automatic distance measuring circuit 10 by driving the motor driving circuit 70 when the second step release switch SW0 is turned ON, adjusts the diaphragm (not shown) in accordance with the exposure amount measured by the brightness measuring circuit 20, operates the shutter 60, and carries out the photograph (Step 260). At this time, a high level flash signal TRIG is input to the strobe 40, so that the strobe 40 flashes and the photograph is taken.

Current flows through the transistor Q5 when the high level flash signal TRIG produced from the microcontroller 50 is applied to the base terminal of the transistor Q5 in the emitter 45 of the strobe 40. The charge in the capacitor C4 discharges through the coils of one section of the transformer T2 to induce a high voltage on the coils of the other section of the transformer T2 and the high voltage is applied to the Xenon lamp XE. When the high voltage is applied to the Xenon lamp XE, the Xenon in the Xenon lamp XE discharges and light flashes. At this time, the strobe 40 starts to flash in accordance with the calculated flash time, and when the calculated flash time elapses, the microcontroller 50 outputs a flash signal TRIG of low level. When the flash signal TRIG of low level from the microcontroller 50 is applied to the base terminal of the transistor Q5 in the strobe 40, the voltage is removed from the Xenon lamp XE and the flash stops since the transistor Q5 is turned OFF and the current passage is blocked.

Accordingly, the flash time of the strobe 40 is determined when the transistor Q5 is turned ON, the microcontroller 50 transmits the flash signal TRIG of high level to the strobe 40 in accordance with the calculated flash time t, and accordingly, a photograph with a suitable exposure is taken in accordance with the measured distance.

Till now, the operation of the strobe 40 was explained mainly with reference to FIG. 2. Now, the operation of the strobe in FIG. 3 will be explained in detail.

Power $V_B$ of voltage of 3 to 6 used for the camera is input to the DC converter 41, and power $V_B$ is converted to about an output voltage of 300 and is output. The capacitors C6, C7 and C8 in the strobe 45 are charged with the output voltage of the DC converter 41.

At this time, the output voltage from the DC converter 41 is divided by the resistors R15 and R16 of the sensor 43 and is produced as the charge state signal NES such that the microcontroller 50 senses successively the voltage charged to the main capacitor C8 in the emitter 45.

The microcontroller 50 determines whether the voltage detected by the sensor 43 is greater than a minimum flash voltage, and if the voltage is greater than the minimum flash voltage, the microcontroller 50 calculates a brightness Gno using the input distance information, produces the flash signal TRIG according to the result and controls the flash.

As described above, the charge time of the strobe can be reduced, the transient image can be photographed and the battery of the strobe can be saved because a photograph can be taken even when the strobe is not completely charged if a desired photograph is possible with the present charge voltage of the strobe.

In addition, the present invention has another advantage in that an underexposed photograph is prevented because the operation of the shutter is stopped and the strobe is further charged when a photograph is impossible in the present charge voltage.

It will be apparent to those skilled in the art that various modifications and variations can be made in the camera and method of the present invention without departing from the spirit or scope of the invention. Thus, it is intended that the present invention cover the modifications and variations of this invention provided they come within the scope of the appended claims and their equivalents.

What is claimed is:

1. A camera having an automatic flash function, comprising:

first means for measuring a distance with respect to an object to be photographed;

second means for measuring an ambient brightness surrounding the object;

a shutter for operating the camera;

a strobe for emitting a flash when energized;

means for charging the strobe when power is applied to the camera;

means for detecting charge state of the strobe and a microcontroller including:

first means, responsive to said first and second measuring means, for determining whether the measured distance and the ambient brightness are within the range for the strobe to be energized sufficient to obtain a photograph with a suitable exposure, second means, responsive to said first determining means, for determining a charge state of the strobe when it is determined that the measured distance and the ambient brightness are within the range for the strobe to be energized, means, responsive to said second determining means, for comparing a present charge state of the strobe to a predetermined minimum charge voltage when the strobe is not completely charged, fourth means, responsive to said comparing means, for determining whether a photograph of the object can be taken at the measured distance from the object and at the present charge state, third means, responsive to said second determining means and said fourth determining means, for determining a first duration of flash from the strobe based on the measured distance and brightness when the strobe is fully charged and for calculating a second duration of the flash from the strobe when it is determined that the photograph of the object can be taken and the strobe is not completely charged, and means for energizing the strobe for a selected one of said first and second durations of the flash.

2. The camera according to claim 1, wherein said microcontroller includes means for controlling the operation of the shutter and charging of the strobe when the present charge state of the strobe is less than the predetermined minimum charge voltage.

3. The camera according to claim 1, wherein said microcontroller includes means for stopping the shutter operation and charging of the strobe when it is determined the photograph of the object cannot be taken at the present charge state of the strobe.

4. The camera according to claim 1, wherein the microcontroller includes calculating means for calculating an F number in accordance with a focal length when the focal length is varied and for determining whether a suitable exposure can be obtained in accordance with the F number and the charge state of the strobe.

5. A camera having an automatic flash function, comprising:

a plurality of switches including a power switch, a first step release switch, a second step release switch, and a photographing mode conversion switch;

first means for measuring a distance with respect to an object to be photographed and for producing a signal corresponding to the measured distance when the first step release switch is activated;

second means for measuring an ambient brightness surrounding the object and for producing a signal corresponding to the measured brightness when the first step release switch is activated;

a shutter for being operated when the second step release switch is activated;

a strobe for emitting a flash with a first predetermined amount of illumination to supplement any existing illumination on the object when the brightness measured by the second means is below a second predetermined amount of brightness;

a microcontroller, the microcontroller including:

means for charging the strobe when power is applied to the camera;

means for receiving the measured distance and brightness signals respectively from the first and second measuring means when the first step release switch is activated;

means for determining whether the measured distance and the ambient brightness are within a range for the strobe to be emitted in accordance with the measured signals to obtain a photograph with a suitable exposure;

means for determining a charge state of the strobe when the measured distance and the ambient brightness are within the range for the strobe to be emitted;

means for comparing a present charge state of the strobe to a predetermined minimum charge voltage when the strobe is not completely charged;

means, responsive to the comparing means, for determining whether a photograph of the object can be taken at the distance from the object and at the present charge state;

means for determining a first duration of the flash from the strobe in accordance with the measured distance when the strobe is completely charged and for calculating a second duration of the flash from the strobe when the photograph can be taken and the strobe is not completely charged;

means for driving the shutter when the second step release switch is activated; and means for emitting the strobe for one of the first and second calculated durations of the flash.

6. A method for controlling a camera having an automatic flash function with a strobe and a shutter, comprising the steps of:

charging the strobe when power is applied to the camera;

measuring a distance from the camera to an object to be photographed;

measuring an ambient brightness surrounding the object;

determining whether the strobe should be used in accordance with the measured distance and brightness to obtain a photograph with a suitable exposure;

checking a charge state of the strobe when it is determined that the strobe should be used;

comparing a present charge state of the strobe and a predetermined minimum charge voltage when the strobe is not completely charged;

setting a duration for a flash of the strobe when the photograph can be taken in the present charge state; and energizing the strobe for the set duration when the camera is activated.

7. The method according to claim 6, further comprising the steps of stopping the operation of the shutter and the charging of the strobe when the present charge state is less than the predetermined minimum charge voltage.

8. The method according to claim 6, further comprising the steps of stopping the shutter operation of the camera and charging the strobe when the photograph of the object cannot be taken in the present state.

9. The method according to claim 6, further including a calculating step for calculating an F number in accordance with a focal length when the focal length is varied and wherein said determining step includes determining whether the photograph with a suitable exposure can be obtained in accordance with a adjustable F number and the charge state of the strobe.

10. A method for controlling a camera having an automatic flash function, the camera including a strobe, a first step release switch, and a second step release switch, the method comprising steps of:

applying power to the camera;

charging the strobe when the power is applied to the camera;

measuring a distance from an object to be photographed;

measuring an ambient brightness surrounding the object;

calculating an exposure amount in response to the distance measuring and brightness measuring steps when the first step release switch is activated;

determining whether the strobe should be used in accordance with the measured distance and the measured brightness to obtain a photograph with a suitable exposure;

checking a charge state of the strobe when the strobe should be used;

comparing a present charge voltage and a predetermined minimum charge voltage when the strobe is not completely charged;

calculating a brightness of the strobe in accordance with the measured distance and an F number in response to the comparing step;

setting a duration for a flash of the strobe when the photograph can be taken in the present charge state; and carrying out the photography by flashing the strobe for the set duration when the second step release switch is activated.

* * * * *